United States Patent [19]
Klindworth

[11] 4,191,260
[45] Mar. 4, 1980

[54] FOLDING WIDE PASS DRAFT IMPLEMENT

[76] Inventor: Duane O. Klindworth, P.O. Box 133, Hogeland, Mont. 59529

[21] Appl. No.: 886,944

[22] Filed: Mar. 15, 1978

[51] Int. Cl.² ............................................. A01B 73/00
[52] U.S. Cl. .................................... 172/311; 280/401; 280/656
[58] Field of Search ............... 172/311, 456, 662, 240; 56/228, 385; 111/57; 280/401, 411 R, 411 A, 639, 656

[56] References Cited

U.S. PATENT DOCUMENTS

| | | | |
|---|---|---|---|
| 3,321,028 | 5/1967 | Groenke | 172/311 |
| 3,844,358 | 10/1974 | Shuler et al. | 172/311 |
| 3,967,684 | 7/1976 | Haverdink | 172/311 |
| 4,030,551 | 6/1977 | Boetto et al. | 172/311 X |
| 4,127,283 | 11/1978 | Baden | 280/411 R |
| 4,133,391 | 1/1979 | Richardson et al. | 172/311 |

FOREIGN PATENT DOCUMENTS 2310819 9/1973 Fed. Rep. of Germany ........... 172/311

*Primary Examiner*—Richard T. Stouffer
*Attorney, Agent, or Firm*—Clarence A. O'Brien; Harvey B. Jacobson

[57] ABSTRACT

A center towing hitch section including five side-by-side wing hitch sections disposed to each of the opposite sides of the center hitch section. Adjacent marginal portions of the hitch sections are pivotally connected and the first wing sections may be swung upwardly into upstanding positions overlying the adjacent sides of the center section. The second wing sections are swingable upwardly and inwardly into inverted superposed positions over the first wing sections and the third wing sections are swingable into juxtaposition with the second sections and the undersides of the second and third sections opposing each other. The fourth sections are swingable into inverted superposed positions relative to the third sections and the fifth wing sections are swingable into juxtaposition with the fourth sections and the undersides of the fourth and fifth sections opposing each other. Each hitch section includes a pivotally mounted trailing gang section and the gang sections of the second and fourth wing sections are swingable upwardly and forwardly over the corresponding wing sections. The outer side marginal portions of the third and fifth sections include dolly wheels rotatable about front to rear extending axes and each of the gang sections of the first through the fifth hitch sections includes a pair of front and rear support wheels with each rear support wheel centered relative to the plan area of the corresponding gang section and each front wheel disposed inwardly of the rear outer corner of the corresponding hitch section.

15 Claims, 18 Drawing Figures

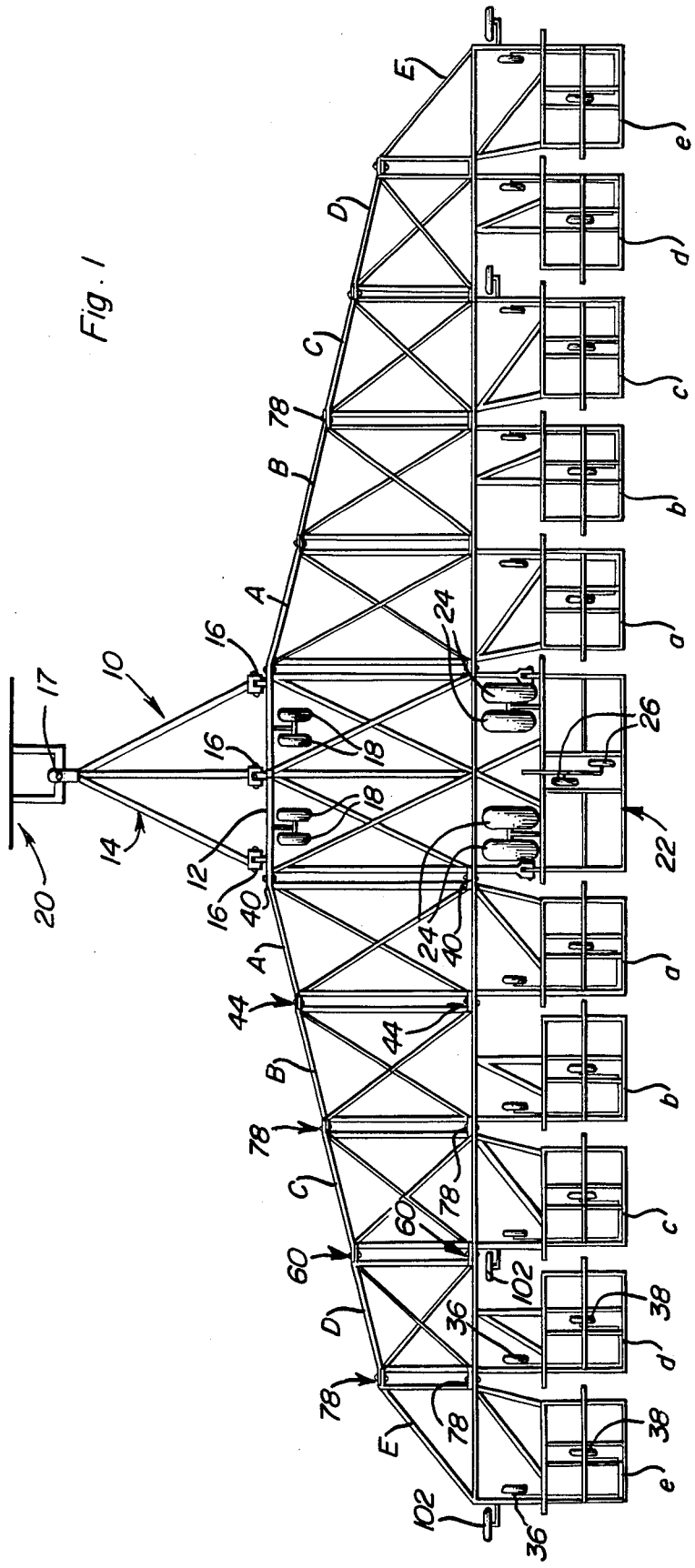
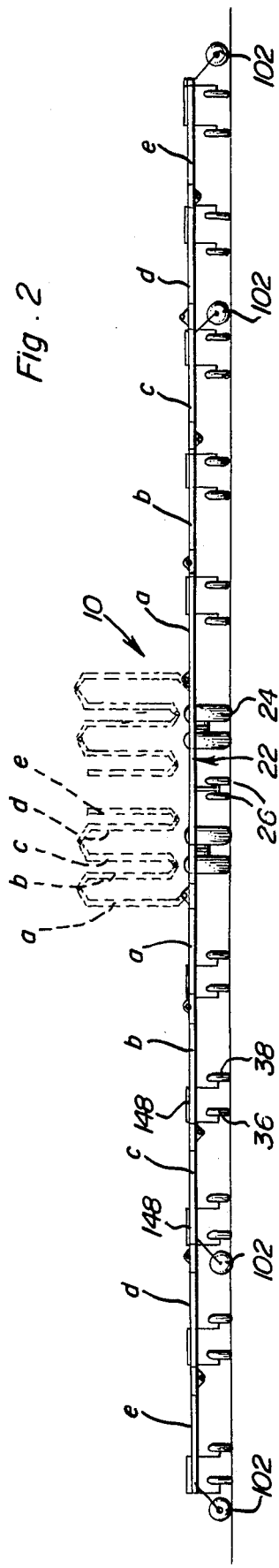

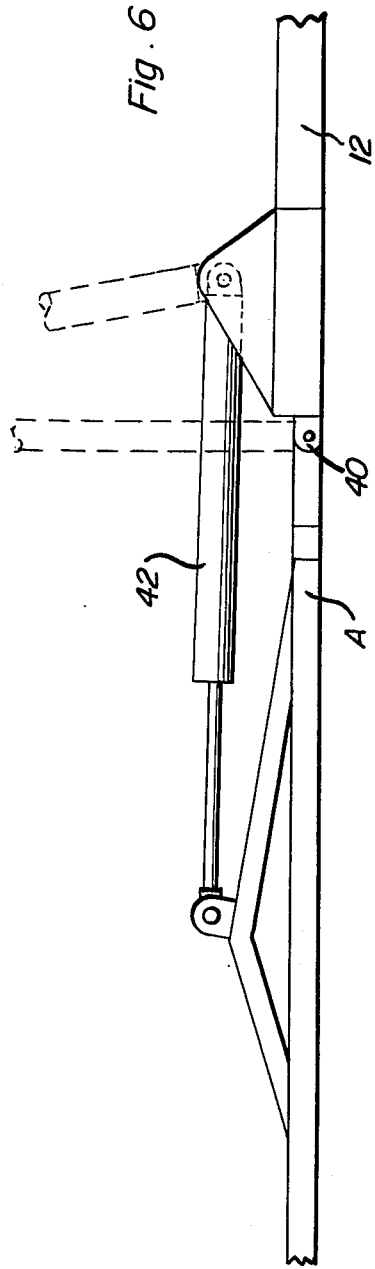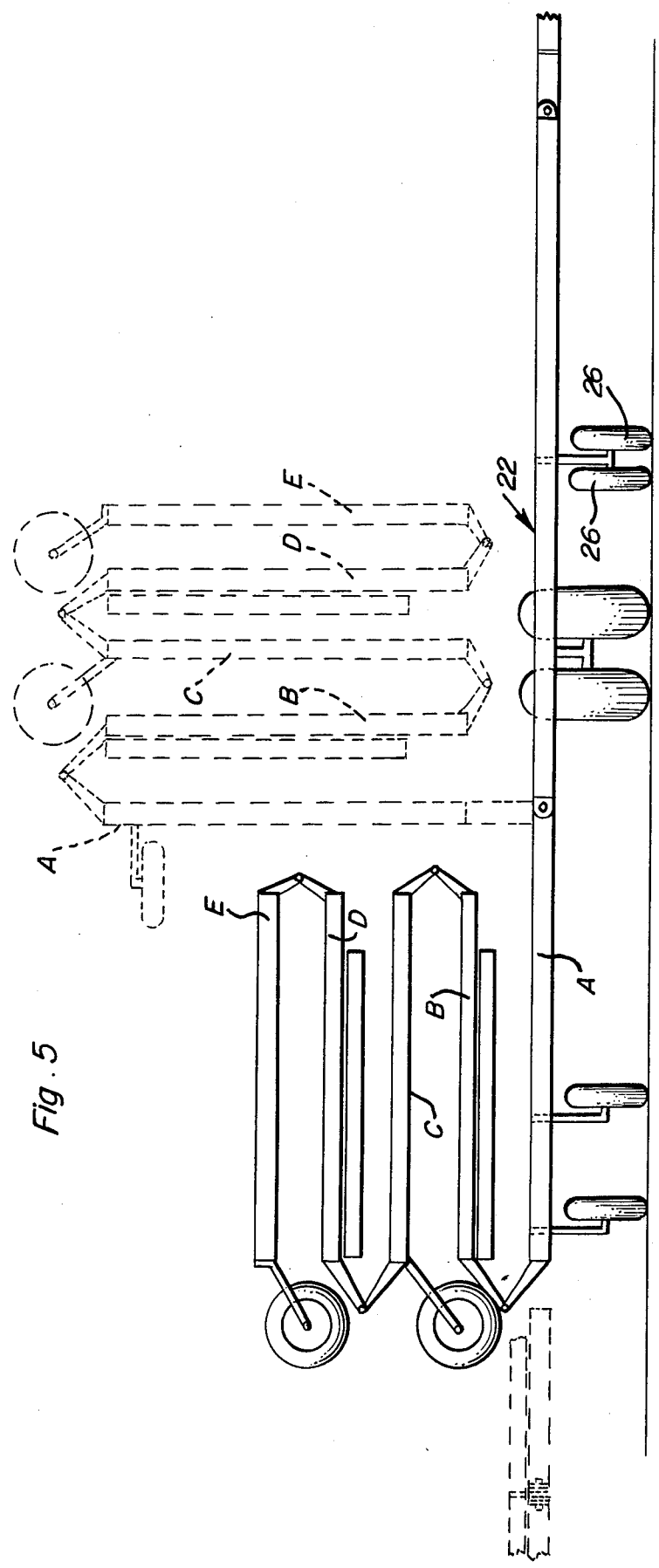

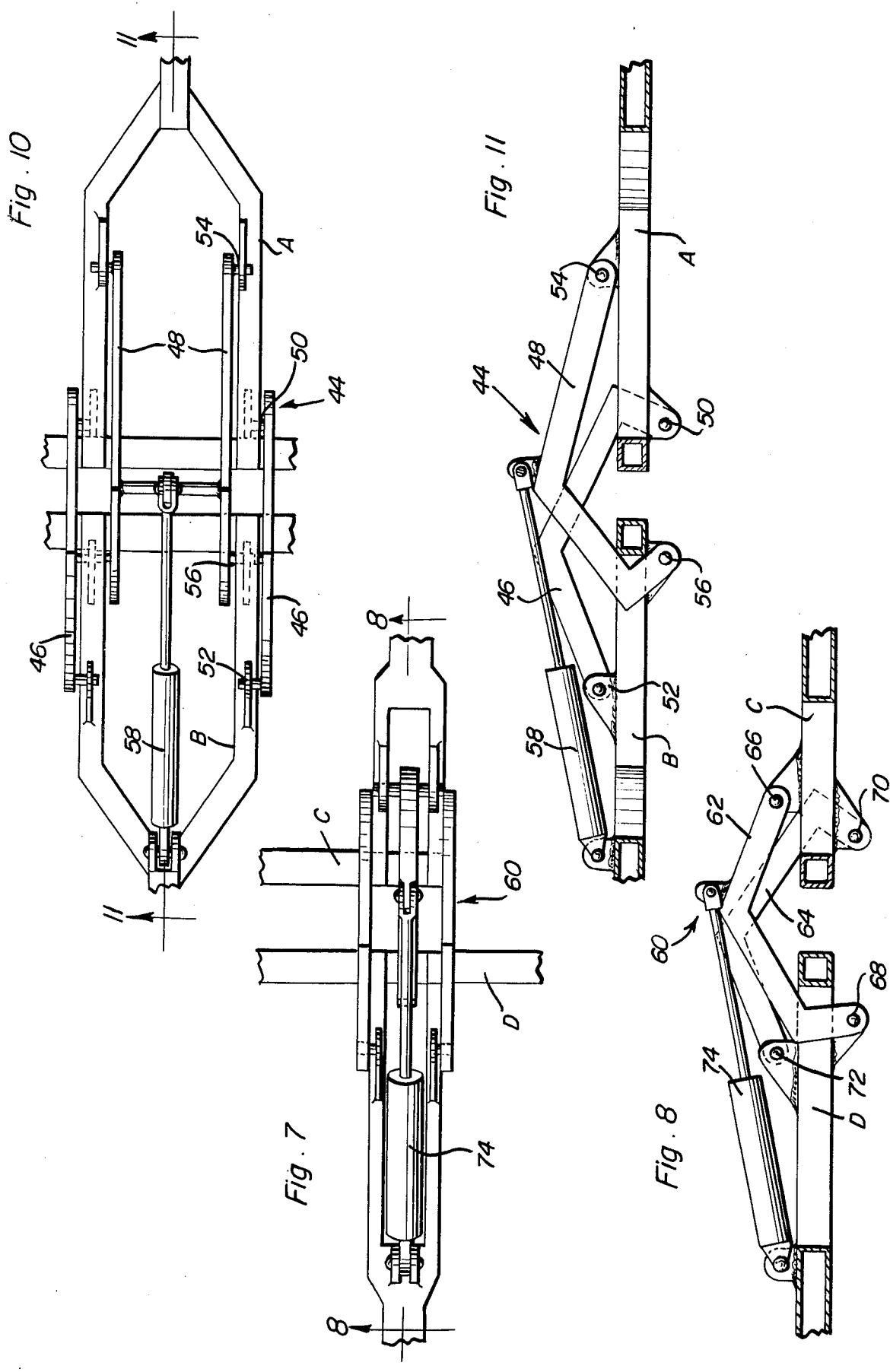

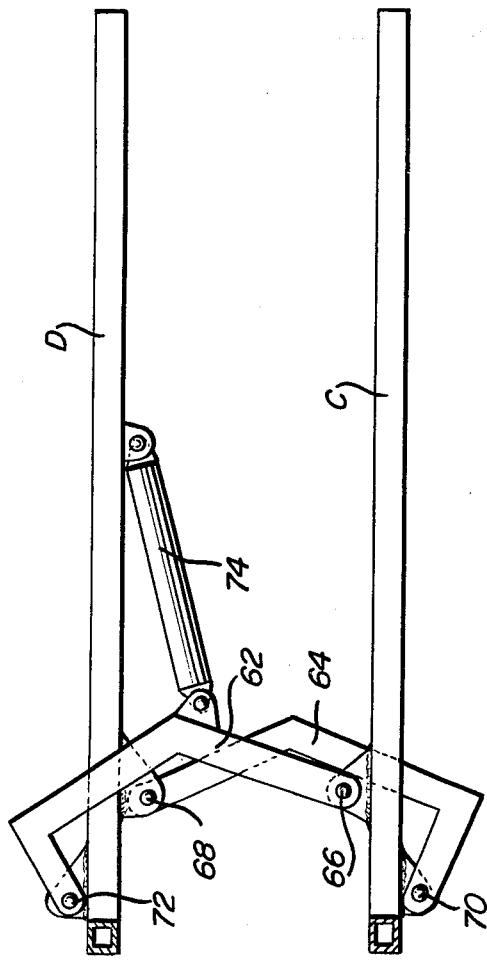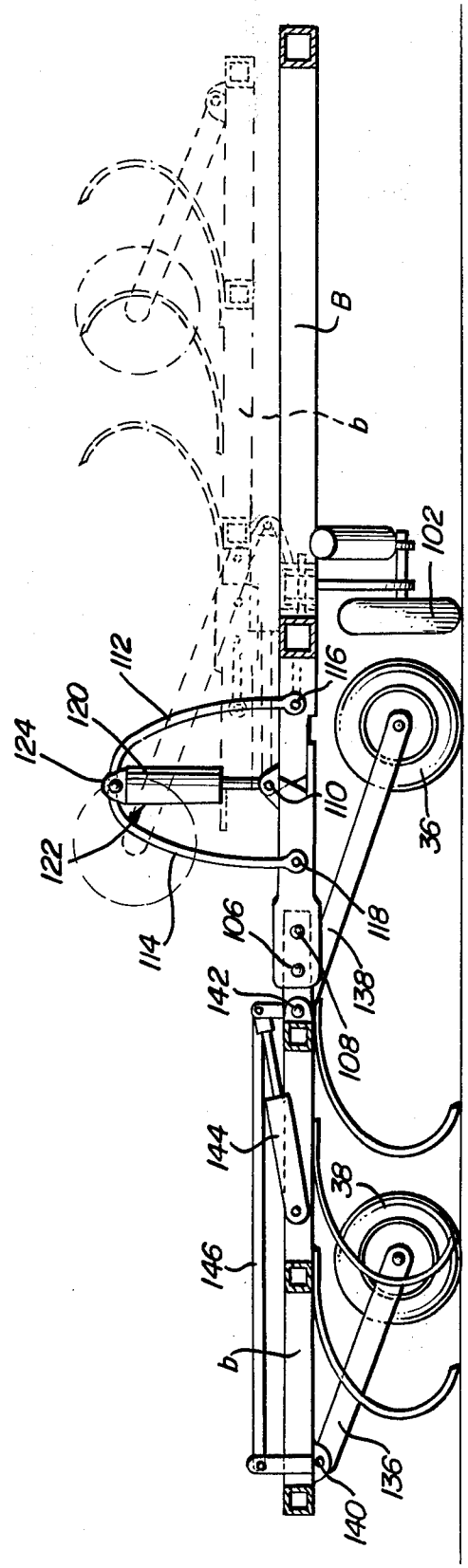

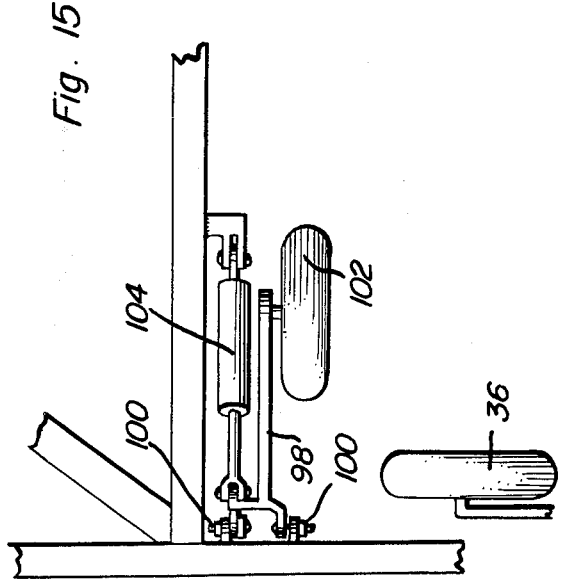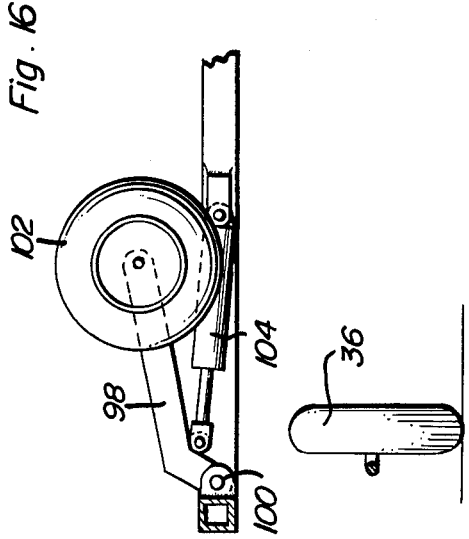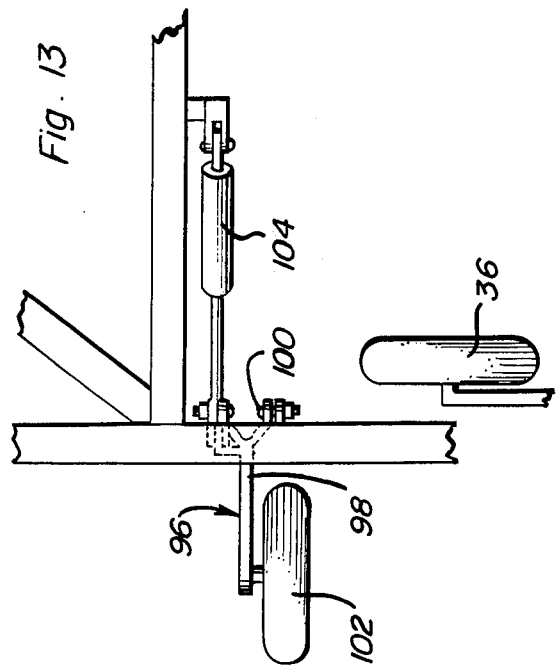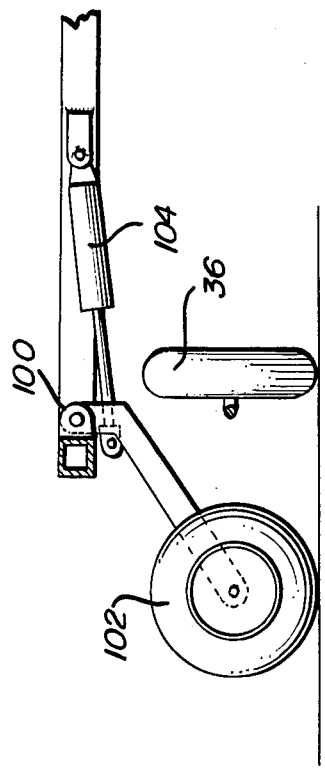

FOLDING WIDE PASS DRAFT IMPLEMENT

BACKGROUND OF THE INVENTION

There have been many forms of wide pass chisel plows heretofore constructed including chisel plows which may be folded for road transport. However, while some of the foldable chisel plows have been constructed of maximum widths up to 80 feet, very large and powerful tractors are capable of pulling wider chisel plows and the chisel plow of the instant invention may be constructed with a maximum width of approximately 170 feet.

Examples of previously known forms of folding implements including some of the general structural and operational features of the instant invention are disclosed in U.S. Pat. Nos. 3,321,028, 3,414,064, 3,669,195, 3,841,412, 3,844,358, 3,967,684 and 3,990,521.

BRIEF DESCRIPTION OF THE INVENTION

The folding wide pass draft implement of the instant invention is constructed in a manner whereby a wide pass implement of up to 170 feet in width may be provided and yet the implement may be folded into a road transport position having heigth and width dimensions of less than those which are usually associated with foldable implements having a maximum width of only 80 feet.

The main object of this invention is to provide a wide pass implement of a width approaching at least 170 feet and which may be folded into a compact state for road transport.

Another object of this invention is to provide a wide pass implement in accordance with the preceding object and constructed in a manner whereby the implement may readily conform to irregular ground contours.

Still another object of this invention is to provide an implement which may be quickly folded into its road transport condition and unfolded into its field working condition.

Another important object of this invention is to provide a wide pass implement including hinged connections between the various relatively foldable components thereof which will evenly distribute the stresses created during field work on the corresponding relatively pivotable sections of the implement.

Another important object of this invention is to be able to mount additional pieces of equipment, such as frame-mounted drag-harrows or shank mounted rod-weeder attachments, so as to accomplish two farming operations in one, and still fold the invention into road transport with the additional pieces of equipment attached.

A final object of this invention is to be specifically enumerated herein is to provide a wide pass implement in accordance with the preceding objects and which will conform to conventional forms of manufacture, be of simple construction and relatively easy to fold and unfold to the road transport and field working conditions, respectively, so as to provide a device that will be economically feasible, long lasting and relatively trouble fee in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of the wide pass implement of the instant invention;

FIG. 2 is a rear elevational view of the wide pass implement with the dolly wheels for folding in the lowered positions and with the various folding components of the implement illustrated in folded positions in phantom lines;

FIG. 5 is a fragmentary rear elevational view illustrating all of the wing sections of FIG. 3 in vertically stacked relation immediately prior to their being swung, as a unit, 90 degrees to the fully folded positions over the corresponding marginal portion of the center section, the fully folded position being illustrated in phantom lines;

FIG. 6 is a fragmentary rear elevational view illustrating the hydraulic connection between the center section and one of the adjacent wing sections for folding that wing section and the wing sections stacked thereover into their final folded positions;

FIG. 7 is a top plan view of one of the front and rear pivot connections utilized between the third and fourth wing sections;

FIG. 8 is a fragmentary vertical sectional view taken substantially upon the plane indicated by the section line 8—8 of FIG. 7;

FIG. 9 is a fragmentary vertical sectional view illustrating the pivot connection of FIGS. 7 and 8 in position with the fourth wing section in inverted position over the third wing section;

FIG. 10 is a fragmentary top plan view of one of the front and rear pivot connections utilized between the first and second wing sections;

FIG. 11 is a fragmentary sectional view taken substantially upon the plane indicated by the section line 11—11 of FIG. 10;

FIG. 12 is a fragmentary enlarged vertical sectional view illustrating the pivotal connection used between the wing sections and the corresponding gang sections and also the hydraulic structure by which the folding gang sections of the second and fourth wing sections may be folded upwardly and forwardly into superposed positions relative to the second and fourth wing sections;

FIG. 13 is a top plan view of one of the third and fifth wing sections illustrating the dolly wheel thereof in a lowered position;

FIG. 14 is a fragmentary rear elevational view of the assemblage illustrated in FIG. 13;

FIG. 15 is a fragmentary top plan view similar to FIG. 13 but illustrating the corresponding dolly wheel in an upwardly retracted position;

FIG. 16 is a fragmentary rear elevational view of the assemblage illustrated in FIG. 15;

DETAILED DESCRIPTION OF THE INVENTION

Figure 3:
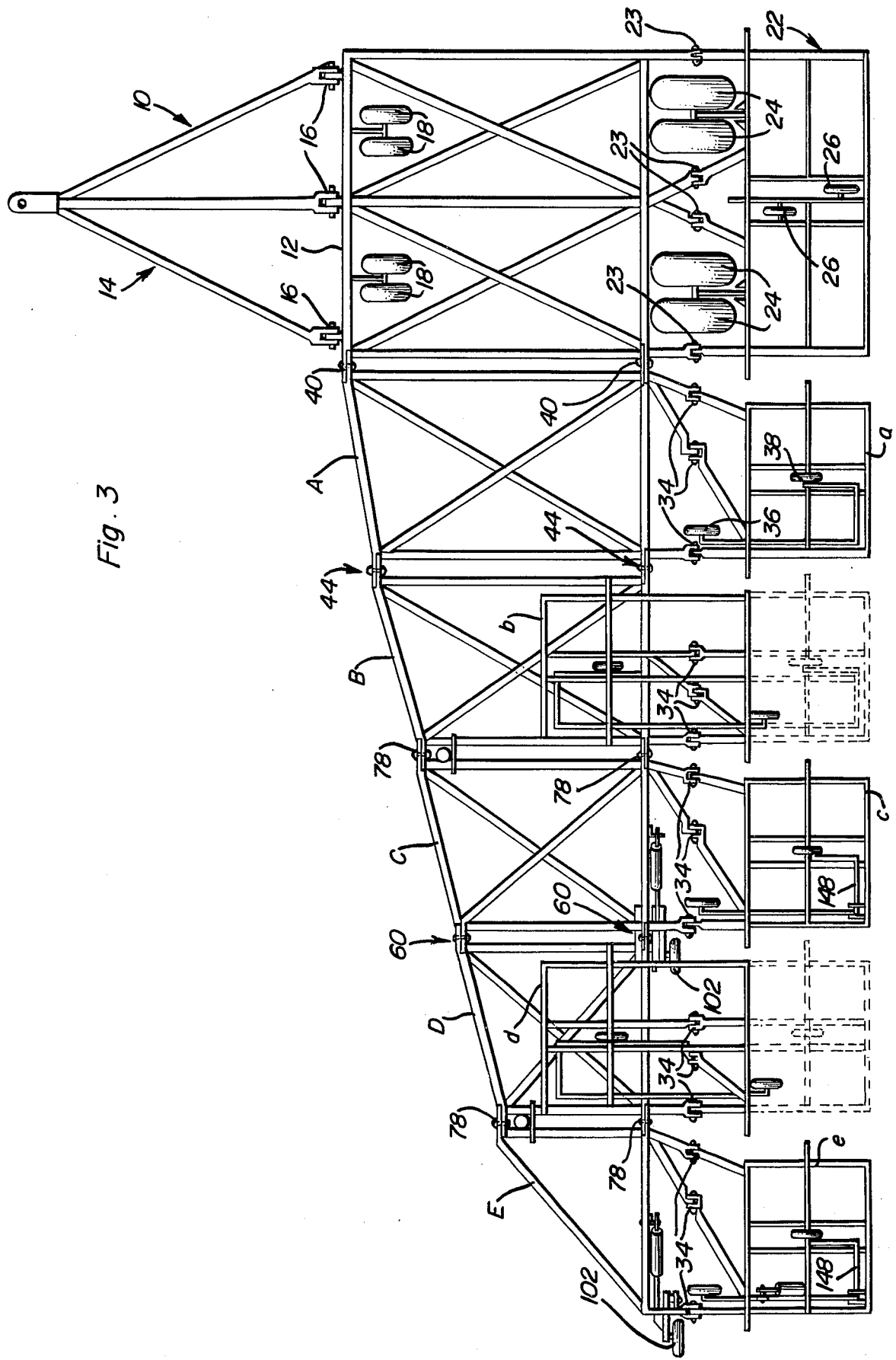
FIG. 3 is an enlarged top plan view of the center section of the implement and the folding sections on one side of the center section.
Figure 4:
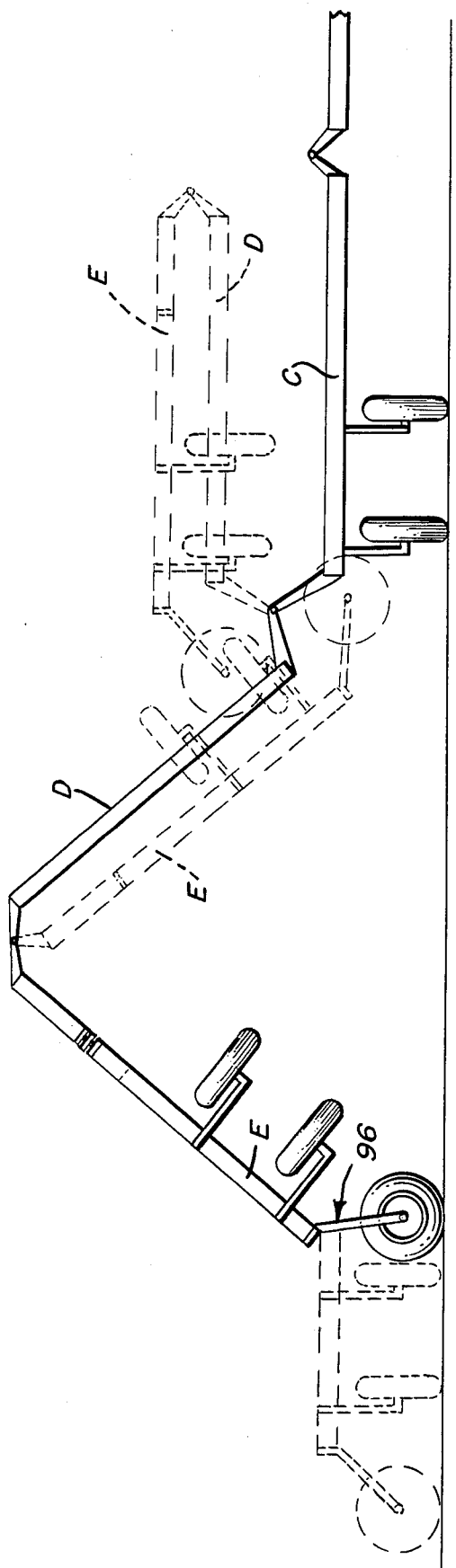
FIG. 4 is a rear elevational view of the three outermost wing sections of the implement illustrated in FIG. 3 in partially folded positions and fully folded positions thereof illustrated in phantom lines.

Referring now more specifically to the drawings, the numeral 10 generally designates the wide pass draft implement of the instant invention. The implement 10 includes a center hitch section 12 to the front end of which the rear end of the hitch referred to in general by the reference numeral 14 is pivotally attached as at 16 in three locations. The front end of the hitch 14 is pivotally attached as at 17 to the rear of a draft vehicle referred to in general by the reference numeral 20.

In addition to the center hitch section 12, the implement 10 includes first, second, third, fourth and fifth wing sections A, B, C, D and E on each side of the center hitch section 12.

The center hitch section 12 includes pairs of opposite side front ground engaging support wheels 18 and a stationary gang section referred to in general by the reference numeral 22 is pivotally attached in four places as at 23 to the rear of the center hitch section 12. The gang section 22 includes opposite side pairs of support wheels 24 and rear center wheels 26 for engagement with the ground and the wheels 24 and 26 are supported from hydraulically actuated depth control arms (not shown).

The sections A, B, C, D and E have gang sections a, b, c, d and e pivotally supported therefrom along aligned axes as at 34 and the pivot connected 34 are aligned with the pivot connections 23. Further, the sections a, b, c, d and e include front and rear support wheels 36 and 38 with each wheel 38 being supported from the central plan area of the corresponding gang section and each support wheel 36 being journaled adjacent the rear outer corner of the corresponding wing section.

The sections A are pivotally connected to the corresponding sides of the center hitch section 12 at front and rear pivot points as at 40, see FIGS. 3 and 6, and a double acting hydraulic cylinder 42 is operatively connected between each section A and the corresponding side of the center hitch section 12 and is operative to swing the section A from a horizontal position to a folded upright position overlying the adjacent marginal edge of the center section 12, see FIG. 6.

Each of the B sections is pivotally supported from the corresponding A section by means of front and rear pivot connections 44, see FIGS. 3, 10 and 11. Each of the pivot connections 44 includes two pairs of cross links 46 and 48 with the links 46 pivotally connected between the A and B sections as at 50 and 52 and each of the links 48 pivotally connected between the A and B sections as at 54 and 56. By utilizing a pair of pivot connections 44 between each pair of sections A and B and with each pivot connection 44 including two pairs of cross links 46 and 48, an extremely strong pivotal connection between the sections A and B is provided against field work created torsional flexure of the A and B sections relative to each other.

With attention now invited more specifically to FIGS. 3, 7 and 8 of the drawings, each of the sections D is pivotally supported from the corresponding section C by means of a pair of front and rear pivot connections referred to in general by the reference numeral 60 and each pivot connection 60 includes a pair of cross links 62 and 64 with the links 62 pivotally interconnected between the sections C and D as at 66 and 68 and the links 64 pivotally connected between the sections C and D as at 70 and 72.

In addition, a double acting cylinder 74 is operatively connected between the section D and the midportion of one of the links 62 and may be actuated to swing the section D into inverted position over the section C in the manner illustrated in FIG. 9 of the drawings.

Figure 17:
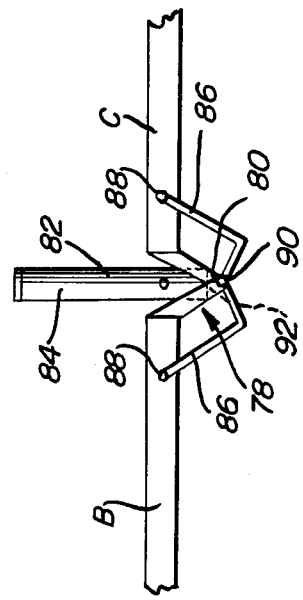
FIG 17 is a fragmentary elevational view of the pivot connections between the fourth and fifth wing sections and also between the second and third wing sections and illustrating the hydraulic structures by which the fifth and third sections may be swung relative to the fourth and second sections.
Figure 18:
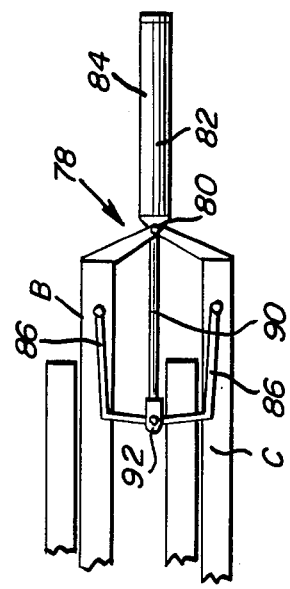
FIG. 18 is an elevational view similar to FIG. 17, but with the illustrated wing sections in relatively folded positions.

With attention now directed more specifically to FIGS. 1, 17 and 18, there may be seen a third pivot connection referred to in general by the reference numeral 78. The pivot connection 78 is utilized in front and rear pairs between the sections D and E and between sections B and C. Each of the pivot connections 78 defines a pivot point 80 between downturned adjacent portions of the corresponding sections and one connection 78 of each pair thereof pivotally supports a cylinder portion 82 of a hydraulic cylinder 84. A pair of steel arms 86 have one pair of corresponding ends thereof pivotally supported from the corresponding hitch sections as at 88 and the other pair of corresponding ends of the steel arms 86 are pivotally connected to the free end of the piston rod 90 of the hydraulic cylinder 84 as at 92. Accordingly, the sections E and C may be swung relative to the sections D and B between the positions thereof illustrated in FIG. 17 and the positions thereof illustrated in FIG. 18.

With attention now invited more specifically to FIGS. 1, 3, 4 and 13 through 16, it may be seen that each of the sections C and E includes a dolly wheel assembly referred to in general by the reference numeral 96 supported therefrom. Each dolly wheel assembly 96 includes a support arm 98 pivotally supported at one end from the corresponding hitch section as at 100 and having a dolly wheel 102 journaled from the other end thereof. The support arm is swingable about an axis extending in a front of rear direction relative to the implement 10 and the arm 98 and corresponding hitch section have a double acting hydraulic cylinder 104 operatively connected therebetween whereby the dolly wheel assemblies 96 may be swung between the lowered and raised positions thereof illustrated in FIGS. 14 and 16 of the drawings.

With attention now invited more specifically to FIG. 12 of the drawings, it may be seen that each of the sections a-e is supported from the corresponding hitch section for rotation about a horizontal transverse axis as at 106 and a remotely operable locking pin 108 may be used to lock the sections a-e in position against swinging relative to the corresponding wing section. Further, a pair of front and rear steel arms 112 and 114 are pivotally connected to the sections B and b and between the sections D and d as at 116 and 118 and to the cylinder portion 120 of a double acting hydraulic cylinder referred to in general by the reference numeral 112 as at 124. Accordingly, upon extension of the hydraulic cylinder 122, the sections b and d may be inverted relative to the sections B and D as illustrated in phantom lines in FIG. 12.

It may also be seen from FIG. 12 of the drawings that the wheels 36 and 38 are supported from crank arms 136 and 138 pivotally supported from the respective gang sections as at 140 and 142 and that a hydraulic cylinder 144 is operatively connected between the crank arm 138 and the corresponding gang section and also that a connecting rod 146 operable connects the crank arms 136 and 138. Also, from FIG. 3 of the drawings, it may be seen that the crank arms 136 include torsion bars 148.

In operation, the implement 10 is drawn behind the draft implement 20 in order to work a field and each of the sections 22, a, b, c, d and e may include the desired earthworking elements.

When it is desired to load the implement 10, the sections b and d are swung forwardly by the respective cylinders 122. Thereafter, the dolly wheels 102 are lowered and the hydraulic cylinders 74 of FIGS. 7 and 8 are retracted in order to swing the sections D upwardly and inwardly into inverted superposed positions over the sections C. As this action occurs, the cylinders 84 connected between the sections D and E are also actuated and the sections E are swung into positions with their undersides opposing the undersides of the sections D. Thereafter, the sections B are swung upwardly and over the sections A in inverted relation relative thereto by means of the cylinders 58 similar to the cylinders 74 and the cylinders 84 operable connected between the sections B and C are also actuated thereby swinging the sections C into positions with their undersides opposing the undersides of the sections B. Of course, after this actions has been completed, the sections B, C, D and E are all disposed in superposed relation relative to the corresponding sections A. Thereafter, the cylinders 42 are actuated to swing each set of sections A through E into upstanding position over the corresponding side of the center hitch section 12. At this point, the implement 10 is fully folded in the manner illustrated in phantom lines in FIG. 2 of the drawings and may be readily transported over the road.

It will be noted that the pivot connections 44 and 60, see FIGS. 8 and 11, include pivot points equally spaced above and below the horizontal frame portions of the corresponding wing sections. Therefore, when considering the plan outline of the center hitch section 12 in FIG. 1 and its pivotal connections with section A (FIG. 6) and also the pivotal connections between sections A and B (FIG. 11) and between sections C and D (FIG. 8), the equally spaced pivots, above and below the horizontal planes containing the horizontal frame portions of sections A and B and sections C and D, cancel out horizontal expansion and compression forces between adjacent sections due to the sections being pulled during field operations and such expansion and/or compression force, therefore, do not tend to upwardly or downwardly offset the pivot connections between adjacent sections A and B and between adjacent sections C and D during field operations.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A multi-section draft implement including a center towing section including front and rear ends and at least three side-by-side outer wing sections each defining a frame section of appreciable plan area and including front and rear ends, disposed to each side of said towing section, first means pivotally connecting the adjacent sides of the first wing sections adjacent said towing section to the corresponding sides of the towing section for upward and inward swinging of said first wing sections to upstanding positions over the adjacent side marginal portion of said center section with said adjacent sides lowermost, second means pivotally connecting the adjacent sides of the second wing sections from said center section to the adjacent sides of the first wing sections for relative swinging upwardly and inwardly into inverted, superposed and substantially parallel positions thereover, and third means pivotally connecting the adjacent sides of the third wing sections from said center section to the adjacent sides of the second wing sections for relative swinging into juxtaposed substantially parallel postions with said second sections and the undersides of each pair of second and third sections opposing each other.

2. A multi-section draft implement including a center towing section including front and rear ends and at least three side-by-side outer wing sections, each also including front and rear ends, disposed to each side of said towing section, first means pivotally connecting the adjacent sides of the first wing sections adjacent said towing section to the corresponding side of the towing section for upward and inward swinging of said first wing sections to upstanding positions over the adjacent side marginal portion of said center section with said adjacent sides lowermost, second means pivotally connecting the adjacent sides of the second wing sections from said center section to the adjacent sides of the first wing sections for swinging upwardly and inwardly into inverted superposed positions thereover, and third means pivotally connecting the adjacent sides of the third wing sections from said center section to the adjacent sides at the second wing sections for relative swinging into juxtaposition with said second sections and the undersides of each pair of second and third sections opposing each other, the remote sides of said third sections including vertically shiftable ground engageable dolly wheel means each journalling a dolly wheel for rotation about an axis extending in a front-to-rear extending direction.

3. A multi-section draft implement including a center towing section including front and rear ends and at least three side-by-side outer wing sections, each also including front and rear ends, disposed to each side of said towing section, first means pivotally connecting the adjacent sides of the first wing sections adjacent said towing section to the corresponding sides of the towing section for upward and inward swinging of said first wing sections to upstanding positions over the adjacent side marginal portion of said center section with said adjacent sides lowermost, second means pivotally connecting the adjacent sides of the second wing sections from said center section to the adjacent sides of the first wing sections for swingingly upwardly and inwardly into inverted superposed positions thereover, and third means pivotally connecting the adjacent sides of the third wing sections from said center section to the adjacent sides of the second wing sections for relative swinging into juxtaposition with said second sections and the undersides of each pair of second and third sections opposing each other, said implement further including successive fourth and fifth side-by-side wing sections, outwardly of said third wing sections, fourth means pivotally connecting the adjacent sides of said fourth sections to the adjacent sides of the third sections for swinging upwardly and inwardly into inverted superposed positions thereover, and fifth means pivotally connecting the adjacent sides of the fifth wing sections to the adjacent sides of the fourth sections for relative swinging into juxtaposition with said fourth sections and the undersides of each pair of fourth and fifth sections opposing each other.

4. The combination of claim 3 wherein the remote sides of said third and fifth sections each include vertically shiftable ground engageable dolly wheel means journalling a dolly wheel for rotation about an axis extending transversely of the corresponding section.

5. A multi-section draft implement including a center towing section including front and rear ends and at least three side-by-side outer wing sectins, each also including front and rear ends, disposed to each side of said towing section, first means pivotally connecting the adjacent sides of the first wing sections adjacent said towing sections to the corresponding sides of the towing section for upward and inward swinging of said first wing sections to upstanding positions over the adjacent side marginal portion of said center section with said adjacent sides lowermost, second means pivotally connecting the adjacent sides of the second wing sections from said center section to the adjacent sides of the first wing sections for swinging upwardly and inwardly into inverted superposed positioned thereover, and third means pivotally connecting the adjacent sides of the third wing sections from said center section to the adjacent sides of the second wing sections for relative swinging into juxtaposition with said second sections and the undersides of each pair of second and third sections opposing each other, each of said wing sections including a gang implement section pivotally supported from the rear end thereof for oscillation about a horizontal transverse axis.

6. The combination of claim 5 wherein the gang implement sections of said second wing sections are swingable upwardly and forwardly into inverted superposed positions relative to said second wing sections.

7. The combination of claim 3 wherein the gang implement sections of said second and fourth wing sections are swingable upwardly and forwardly into inverted superposed positions relative to said second and fourth wing sections, respectively.

8. The combination of claim 7 including motor means operatively connected between the gang implement sections of said second and fourth wing sections for swinging the last mentioned implement sections upwardly and forwardly into inverted superposed positions relative to said second and fourth wing sections.

9. The combination of claim 8 wherein the remote sides of said third and fifth sections each include vertically shiftable ground engageable dolly wheel means journalling a dolly wheel for rotation about an axis extending in a front-to-rear extending direction.

10. The combination of claim 9 wherein each of said gang implement sections of said first, second and third sections includes a pair of front and rear ground engageable wheels supported therefrom for rotation about axes extending transversely of the corresponding section, said rear wheels being generally centered relative to the plan areas of corresponding implement sections and the front wheels being disposed on the outer rear quadrants of the plan areas of the corresponding wing sections.

11. The combination of claim 5 wherein said center section includes ground engageable support wheels journaled for rotation about axes extending transversely of said second section.

12. The combination of claim 11 wherein each of said gang implement sections of said first, second and third sections includes a pair of front and rear ground engageable wheels supported therefrom for rotation about axes extending transversely of the corresponding section, said rear wheels being generally centered relative to the plan areas of corresponding implement sections and the front wheels being disposed in the outer rear quadrants of the plan areas of the corresponding wing sections.

13. The combination of claim 5 including motor means operatively connected between the gang implement sections of said second wing sections for swinging the last mentioned implement and sections upwardly and forwardly into inverted superposed positions relative to said second wing sections.

14. A multi-section draft implement including a center towing section including front and rear ends and at least three side-by-side outer wing sections, each also including front and rear ends, disposed to each side of said towing section, first means pivotally connecting the adjacent sides of the first wing sections adjacent said towing section to the corresponding sides of the towing section for upward and inward swinging of said first wing sections to upstanding positions over the adjacent side marginal portion of said center section with said adjacent sides lowermost, second means pivotally connecting the adjacent sides of the second wing sections from said center section to the adjacent sides of the first wing sections for swinging upwardly and inwardly into inverted superposed positions thereover, and third means pivotally connecting the adjacent sides of the third wing sections from said center section to the adjacent sides of the second wing sections for relative swinging into juxtaposition with said second sections and the undersides of each pair of second and third sections opposing each other, at least one pair of adjacent side-by-side outer wing sections including generally horizontally aligned horizontal main frame sections, at least one of said second and third means includes upper and lower pivot structure supported from each of the adjacent marginal portions of said main frame section spaced generally equally above and below the latter, a pair of crossed support links extending between and pivotally secured at their opposite ends to an upper pivot structure on one main frame section and a lower pivot structure on the other main frame section, and motor means connected between at least one of said main frame sections and one of said links for swinging the latter relative to the last mentioned frame section in a direction to swingably invert a first of said frame sections relative to the other adjacent frame sections.

15. The combination of claim 1 wherein the remote sides of said third sections include vertically shiftable ground engageable dolly wheel means each journalling a dolly wheel for rotation about an axis extending in a front-to-rear extending direction.

* * * * *